(12) United States Patent
Mäder et al.

(10) Patent No.: US 8,415,414 B2
(45) Date of Patent: Apr. 9, 2013

(54) POLYURETHANE FLAME RETARDANT COMPOSITIONS

(75) Inventors: Dietmar Mäder, Oberursel (DE); Pierre Rota-Graziosi, Mulhouse (FR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 11/991,812

(22) PCT Filed: Sep. 6, 2006

(86) PCT No.: PCT/EP2006/066045
§ 371 (c)(1),
(2), (4) Date: Mar. 23, 2011

(87) PCT Pub. No.: WO2007/031450
PCT Pub. Date: Mar. 22, 2007

(65) Prior Publication Data
US 2011/0230604 A1    Sep. 22, 2011

(30) Foreign Application Priority Data

Sep. 16, 2005    (EP) .................................... 05108520

(51) Int. Cl.
*C08K 5/3492*    (2006.01)
(52) U.S. Cl.
USPC ............ 524/101; 524/147; 524/151; 524/153

(58) Field of Classification Search ............ 524/99–101, 524/147, 151, 153
See application file for complete search history.

(56) References Cited

U.S. PATENT DOCUMENTS

| | | | |
|---|---|---|---|
| 5,837,760 A | 11/1998 | Hackl et al. | 524/127 |
| 6,348,526 B1 * | 2/2002 | Blount | 524/100 |
| 7,214,729 B2 * | 5/2007 | Kaprinidis et al. | 524/100 |
| 2002/0115782 A1 | 8/2002 | Brauer et al. | 524/710 |
| 2003/0207969 A1 * | 11/2003 | Capocci et al. | 524/236 |
| 2004/0002559 A1 * | 1/2004 | Troutman et al. | 524/100 |
| 2004/0138351 A1 * | 7/2004 | Kaprinidis et al. | 524/100 |
| 2004/0147648 A1 | 7/2004 | Corcoran | 524/186 |
| 2004/0254270 A1 * | 12/2004 | Harashina | 524/86 |
| 2006/0074154 A1 * | 4/2006 | Harashina et al. | 524/115 |

OTHER PUBLICATIONS

Patent Abstracts of Japan Publication No. 09020743, Jan. 21, 1997.
S. Levchik et al., Polymer International, vol. 53, (2004), pp. 1585-1610.

* cited by examiner

*Primary Examiner* — Peter Szekely
(74) *Attorney, Agent, or Firm* — Tyler A. Stevenson

(57) ABSTRACT

The invention relates to a flame retardant composition, which comprises a) At least one ester of a phosphorus containing oxo acid selected from the group consisting of phosphonous and phosphorous acid; b) At least one flame retardant component based on a nitrogen compound; particularly melamine cyanurate, and c) A polyurethane polymer base.

5 Claims, No Drawings

POLYURETHANE FLAME RETARDANT COMPOSITIONS

The present invention relates to a flame retardant composition, which comprises a combination of a phosphonite or a phosphite with a nitrogen containing flame retardant and polyurethane polymer base.

Thermoplastic polyurethanes (TPU) are useful for many technical applications. Particular reference is made to *Kunststoff-Handbuch, Vol. VII, Polyurethane, Carl Hanser Verlag D-München,* 1*st Edition* 1966, Editors R. Vieweg and A. Höchtlen, *and* 2*nd Edition,* Editor G. Oertel.

Many methods for preparing polyurethanes are known. High molecular weight polyhydroxy compounds, which form the flexible base, for example polyoxyalkylene glycols, such as polyoxypropylene or polyoxyethylene glycol, polyoxypropylene polyoxyethylene glycol, polyoxybutylene glycol, polyoxybutylene polyoxyethylene glycol or polyoxybutylene polyoxypropylene glycol, or polyesterdiols, such as alkanediol polyadipates, are reacted with aromatic or aliphatic diisocyanates, e.g. diphenylmethane-4,4'-diisocyanate (MDI) or hexamethylene-1,6-diisocyanate (HDI), and low molecular weight chain extenders for the formation of rigid segments, for example alkanediols or dialkylene glycols, such as 1,4-butanediol or diethylene glycol. A disadvantage of TPU is their easy inflammability.

Flame retardants are added to polymeric materials (synthetic or natural) to enhance the flame retardant properties of the polymers. Depending on their composition, flame retardants may act in the solid, liquid or gas phase either chemically, e.g. as a spumescent by liberation of nitrogen, and/or physically, e.g. by producing a foam coverage. Flame retardants interfere during a particular stage of the combustion process, e.g. during heating, decomposition, ignition or flame spread.

Nitrogen-containing flame retardants, especially those based on melamine, have been known for a long time and are, in some cases, commercially available. Some of those melamine derivatives also contain phosphorus. Examples of publications relating to such flame retardants are, inter alia, EP-A-782 599, EP-A-1 095 030 and U.S. Pat. Nos. 4,010,137 and 3,915,777.

Combinations of nitrogen-containing flame retardants with flame retardants based on phosphorus compounds are also known. In that respect particular reference is made to, for example, DE-A-197 34 437, DE-A-197 37 727, WO-A-97/39053, EP-A-1 070 754, EP-A-6568 and DE-A-196 14 424. Particular phosphates in combination with nitrogen-containing compounds are also known as flame retardants, for example from EP-A-484 832, EP-A-545 496, EP-A-707 036, WO-A-01/98401, GB-A-1 468 188 and EP-A-617 079.

There is a continuing need for flame retardants that have improved thermal and mechanical properties and that can be used in various polymer substrates. In particular, increased safety and environmental requirements mean that hitherto known flame retardants are no longer capable of satisfying all demands.

The use of melamine or melamine derivatives as flame retardants for TPU has been proposed in various references. As a further development, the use of melamine cyanurate in combination with organic phosphate in TPU compositions has been proposed, e.g. U.S. Pat. No. 5,837,760.

It has now been found that the use of a combination of selected flame retardants, particularly flame retardants based on melamine, with esters derivative of a phosphorus containing oxo acid selected from the group consisting of phosphonous and phosphorous acid results in improved thermal and mechanical properties of TPU.

Therefore, the present invention relates to a composition, which comprises
a) At least one ester derivative of a phosphorus containing oxo acid selected from the group consisting of oxaphosphorinoxide, phosphonous acid and phosphorous acid;
b) At least one flame retardant component based on a nitrogen compound; and
c) A polyurethane polymer base.

According to a preferred embodiment, the present invention relates to a composition, which comprises
a) At least one ester derivative of a phosphorus containing oxo acid selected from the group consisting of phosphonous and phosphorous acid;
b) At least one flame retardant component based on a nitrogen compound; and
c) A polyurethane polymer base.

The compositions according to the invention attain the desirable V-0 rating, according to UL-94 (Underwriter's Laboratories Subject 94) and other excellent ratings in related test methods while preserving the excellent mechanical, chemical and thermal properties of thermoplastic polyurethanes, such as colour and light stability.

The composition, as defined above, comprises the following components:

Component a)

The composition according to the present invention comprises as component a) at least one ester derivative of a phosphorus containing oxo acid selected from the group consisting of oxaphosphorinoxide, phosphonous acid and phosphorous acid.

According to a preferred embodiment the composition according to the present invention comprises as component a) at least one ester derivative of a phosphorus containing oxo acid selected from the group consisting of phosphonous and phosphorous acid.

Oxaphosphorinoxide has a cyclic structure and is represented by the following general formula:

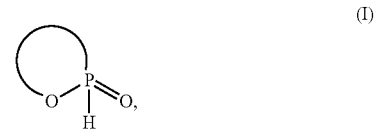

(I)

The phosphorous atom and one oxygen atom are part of a cyclic structure, particularly a five or six membered ring, as represented by the following representative compound:

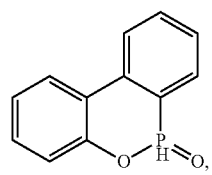

Which can be named as 6H-dibenz[c,e][1,2]oxaphosphorin-6-oxide, 3,4:5,6-dibenzo-2H-1,2-oxaphosphorin-2-oxide or 9,10-dihydro-9-oxa-10-phosphorylphenanthrene-10-oxide, abbreviated as DOPO (C.A. RN 35948-25-5). Such compound is commercially available from Sanko HCA.

Phosphonous acid is represented by the following general formula:

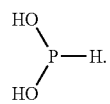
(II)

The acid is a member of the large group of phosphorus containing oxo acids, which includes other members, such as phosphoric, phosphorous or phosphinous acid. Phosphonous acid does not exist in its free form in an aqueous solution.

Ester derivatives of phosphonous acid are represented by the following general formula

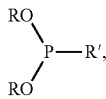
(II')

Wherein R represents an organic ester group and R' represents hydrogen or an organic substituent which is directly attached to the phosphorus atom.

In the event that R' represents hydrogen, the formula II' comprises within its scope the following tautomeric structure:

Phosphorous acid is represented by the following general formula:

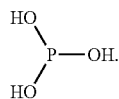
(III)

The acid is a further member of the large group of phosphorus containing oxo acids and does not exist in aqueous solution in its free form as well.

Ester derivatives of phosphorous acid are defined by the term phosphites. They are represented by the following general formula:

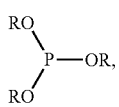
(III')

Wherein R represents an organic ester group.

A preferred embodiment relates to compositions comprising as component a) ester derivatives of phosphorous acid as represented by the following general formulae:

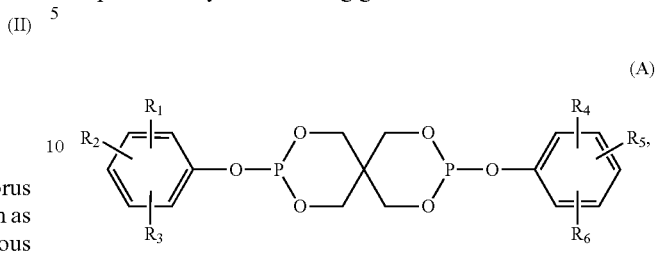
(A)

Wherein
One of $R_1$, $R_2$ and $R_3$ and one of $R_4$, $R_5$ and $R_6$ represent hydrogen and the other ones represent $C_1$-$C_8$alkyl or aryl-$C_1$-$C_4$alkyl; or
$R_1$, $R_2$ and $R_3$ and $R_4$, $R_5$ and $R_6$ represent $C_1$-$C_8$alkyl; or

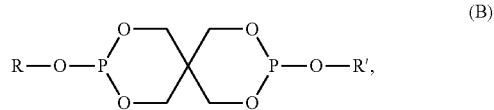
(B)

Wherein R and R' represent $C_9$-$C_{20}$alkyl; or

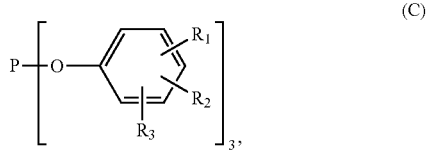
(C)

Wherein
$R_1$, $R_2$ and $R_3$ represent $C_1$-$C_{18}$alkyl; or
one or two of $R_1$, $R_2$ and $R_3$ represent hydrogen and the other ones represent $C_1$-$C_{18}$alkyl; or

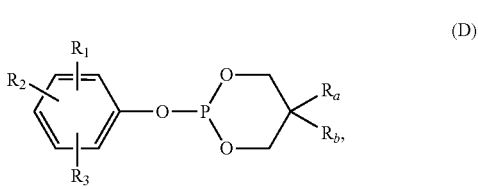
(D)

Wherein one of $R_1$, $R_2$ and $R_3$ represents methyl and the other ones represent $C_3$-$C_4$alkyl; or
$R_1$, $R_2$ and $R_3$ independently of one another represent $C_1$-$C_4$alkyl; and
$R_a$ and $R_b$ represent methyl or ethyl; or

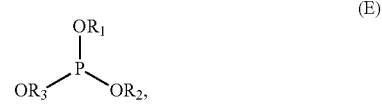
(E)

Wherein $R_1$, $R_2$ and $R_3$ independently of one another represent phenyl or $C_5$-$C_{20}$alkyl; or

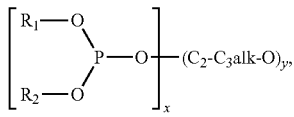 (F)

Wherein x represents two or a numeral greater than two; y represents one or a numeral greater than one and $R_1$ and $R_2$ independently of one another represent phenyl or $C_5$-$C_{20}$alkyl; or

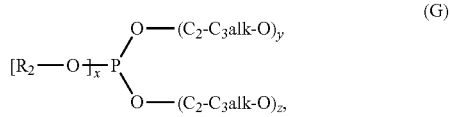 (G)

Wherein x represents one or a numeral greater than one and y and z represent two or a numeral greater than two.

A preferred embodiment relates to compositions comprising as component a) ester derivatives of phosphonous and phosphorous acid selected from the group consisting of

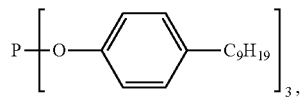

(Irgafos® TNPP, Doverphos® HiPure 4)

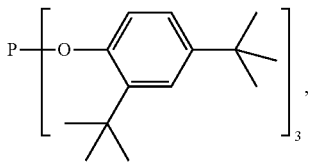

(IRGAFOS 168, DOVERPHOS S-480, S-680)

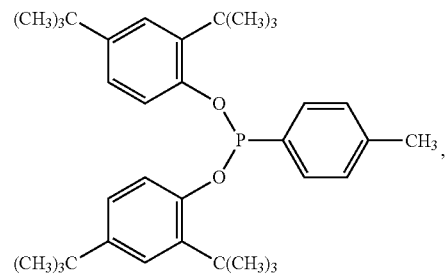

(IRGAFOS P-EPQ, Sandostab® P-EPQ)

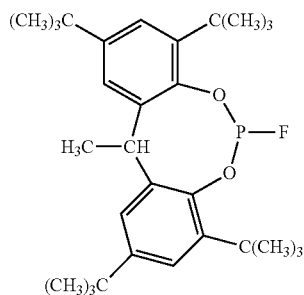

(Ethanox® 398)

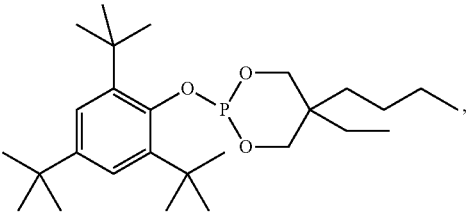

(Ultranox® 641)

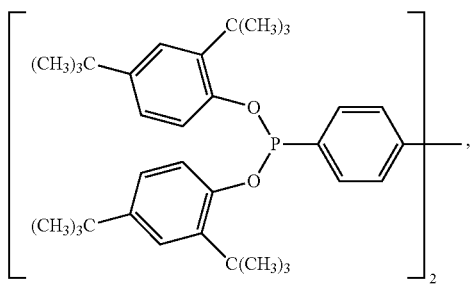

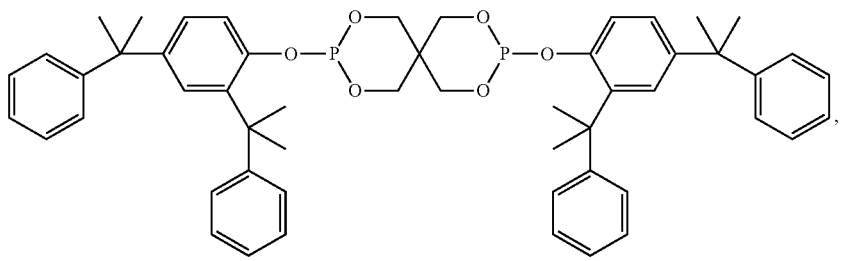

(DOVERPHOS S-9228)

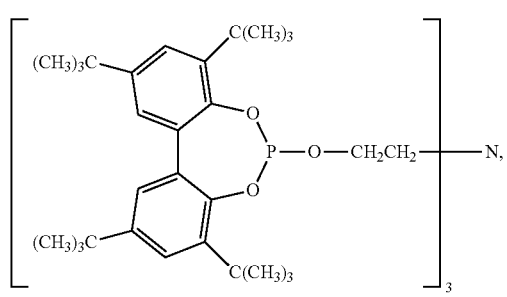
(IRGAFOS 12),

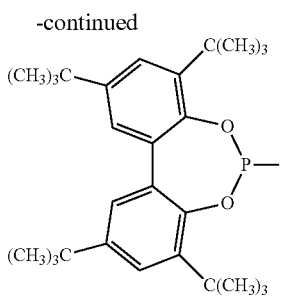
(Mark HP-10)

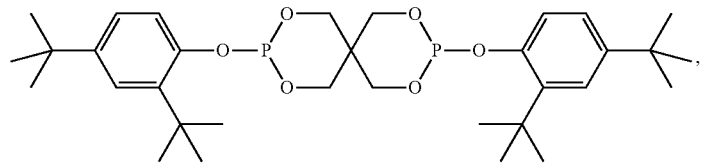
(ULTRANOX 626, IRGAFOS 126)

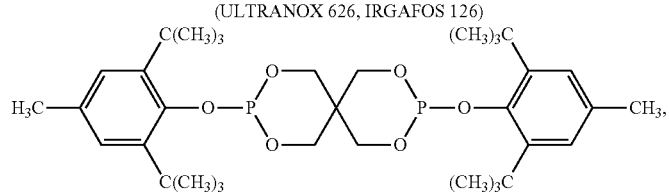
(MARK PEP 36)

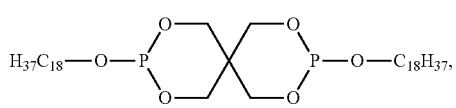
(Weston® 618)

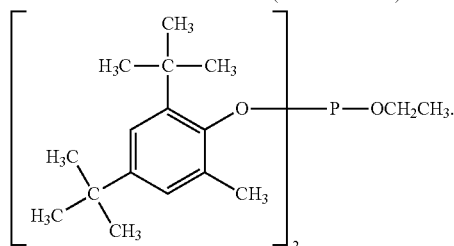
(IRGAFOS 38)

Another preferred embodiment relates to compositions comprising as component a) a cyclic oxaphosphorinoxide of the formula

[CAS RN 35948-25-5]

or an ester derivative of phosphonous or phosphorous acid selected from the group consisting of dipropylene glycol phosphite [CAS RN 40305-86-0],

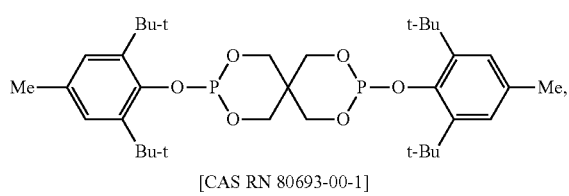
[CAS RN 80693-00-1]

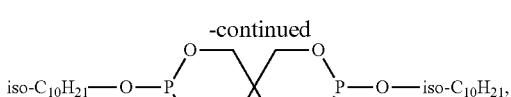
[CAS RN 26544-27-4]

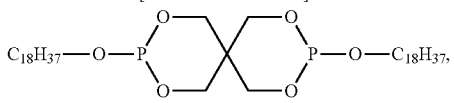
[CAS RN 3806-34-6]

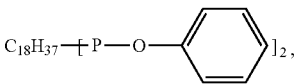
[CAS RN 2082-80-6]

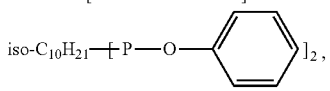
[CAS RN 26544-23-0]

$P(-O\text{-iso}C_8H_{17})_3$, $P(-O-C_{18}H_{37})_3$, $P(-O\text{-iso}C_{10}H_{21})_3$, $P(-O-C_{12}H_{25})_3$,
$P(-O\text{-2-ethylhexyl})(-O-C_6H_5)_2$, $(C_6H_5-O-)_2P-O-C_2H_4O-P(-O-C_6H_5)_2$,

[(C₆H₅—O—)₂P]₂(—O—C₂H₄)₂ [CAS RN 57077-45-9], (C₆H₅—O—)₂P—O—CH(CH₃)CH₂—O—P(—O—C₆H₅)₂,

[(C₆H₅—O—)₂P]₂(—OC₂H₅)₁₄(C₆H₅—O—P)₆ [CAS RN 67383-54-4],

[(C₆H₅—O—)₂P]₂(—OCH(CH₃)CH₂)₁₄(C₆H₅—O—P)₆ [CAS RN 80584-86-7], and tris[2-(2-hydroxypropoxy)-1-methylethyl]phosphorous acid ester [CAS RN 13474-96-9].

A particularly preferred embodiment relates to compositions comprising as component a) ester derivatives of phosphonous and phosphorous acid selected from the group consisting of triphenyl phosphite, diphenylalkyl phosphite, phenyldialkyl phosphite, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

A highly preferred embodiment relates to compositions comprising as component a) ester derivatives of phosphonous and phosphorous acid selected from the group consisting of aryl organo phosphites, such as tris nonylphenyl phosphite (TNPP DOVERPHOS 4), triphenyl phosphite (TPP DOVERPHOS 10) or diphenyl phosphite (DPP DOVERPHOS 213), aryl-alkyl organo phosphites, such as phenyl diisodecyl phosphite (PDDP DOVERPHOS 7), diphenyl isodecyl phosphite (DPDP DOVERPHOS 8), diphenylisooctyl phosphite (DPIOP DOVERPHOS 9), tetraphenyl dipropylene glycol diphosphite (THOP DOVERPHOS 11), poly (dipropylene glycol) phenyl phosphite (DHOP DOVERPHOS 12) or dodecyl diphenyl phosphite (DDPP), and alkyl organo phosphites, such as triisodecylphosphite (TDP DOVERPHOS 6), tris tridecyl phosphite (TTDP DOVERPHOS 49) or trilauryl phosphite (TLP DOVERPHOS 53).

A further highly preferred embodiment of the invention relates to compositions comprising as component a) an ester derivative of phosphonous or phosphorous acid selected from the group consisting of 9,10-dihydro-9-oxa-10-phosphorylphenanthrene-10-oxide (DOPO), bis(2,6-di-tert-butyl-4-methylphenyl)-pentaerythritol diphosphite [CAS RN 80693-00-1], [(C₆H₅—O—)₂P]₂(—O—C₂H₄)₂ [CAS RN 57077-45-9], [(C₆H₅—O—)₂P]₂(—OC₂H₅)₁₄(C₆H₅—O—P)₆ [CAS RN 67383-54-4] and triphenyl phosphite.

The ester derivatives of phosphonous and phosphorous acid are known compounds and are commercially available.

According to a particularly preferred embodiment the invention relates to compositions, which comprises as component a) ester derivatives of phosphonous and phosphorous acid selected from the group consisting of the commercial products IRGAFOS 126, 168, 38, PEPQ, 12, TNPP and DDPP, WESTON 618 and Mark PEP 36.

According to a particularly preferred embodiment the invention relates to compositions, wherein component a) is present in an amount equal or higher than 1% by weight based on the total weight of the composition.

Component b)

The composition according to the invention comprises as Component b) at least one nitrogen compound selected from the group consisting of:

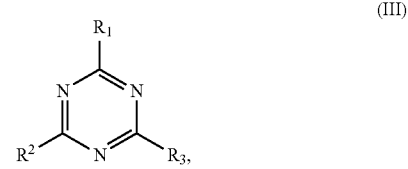

(III)

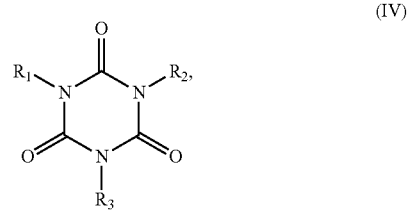

(IV)

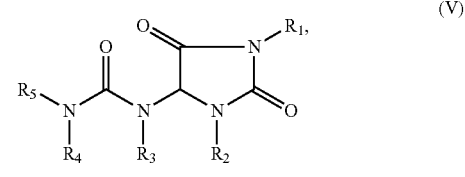

(V)

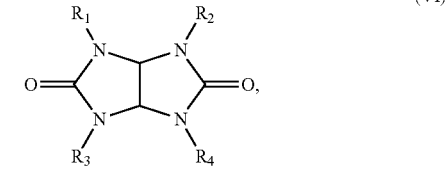

(VI)

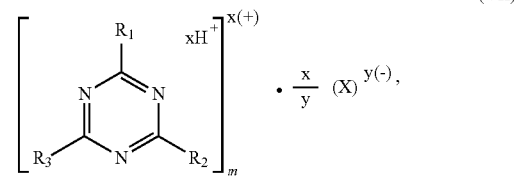

(VII)

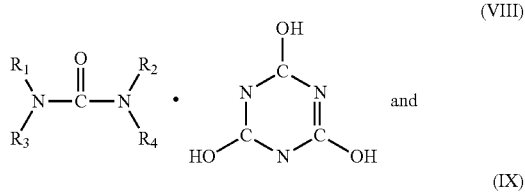

(VIII)

and

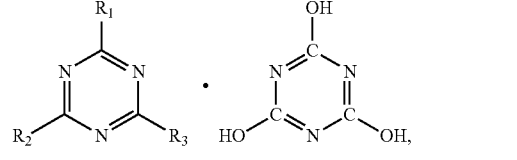

(IX)

Wherein in the compounds (III), (VII) and (IX):

$R_1$, $R_2$ or $R_3$ independently of one another represent substituents selected from the group consisting of $C_1$-$C_8$alkyl, $C_5$-$C_6$cycloalkyl and $C_1$-$C_4$alkyl-$C_5$-$C_6$cycloalkyl with hydroxy as an optional substituent; or represent substituents selected from the group consisting of $C_2$-$C_8$alkenyl, $C_1$-$C_8$- alkoxy, $C_2$-$C_8$alkenyl; $C_1$-$C_8$alkoxy, acyl, acyloxy, $C_6$-$C_{12}$aryl, —O—$R^1$ and —N($R^1$)$R^2$, wherein $R^1$ and $R^2$ independently of one another represent hydrogen, $C_1$-$C_4$alkyl, $C_5$-$C_6$cycloalkyl, $C_2$-$C_8$alkenyl, $C_2$-$C_4$hydroxyalkyl or $C_6$-$C_{12}$aryl; or One of $R_1$, $R_2$ and $R_3$ represents hydrogen and two of $R_1$, $R_2$ and $R_3$ represent the substituents as defined above; or Two of $R_1$, $R_2$ and $R_3$ represent hydrogen and one of $R_1$, $R_2$ and $R_3$ represents a substituent as defined above;

X represents the anion of a protonic acid;

x is a numeral that represents the number of protons transferred from the latter to the triazine compound; and y is a numeral that represents the number of protons abstracted from the protonic acid;

provided that

In compounds (VII) one group is present that is capable of adding a proton; and

Compounds (III) are excluded, wherein $R_1$, $R_2$ and $R_3$ represent groups of the partial formula —N($R^1$)$R^2$ and $R^1$ and $R^2$ represent hydrogen;

And wherein in the compounds (IV), (V), (VI) and (VIII):

$R_1$, $R_2$, $R_3$, $R_4$ and $R_5$ independently of one another represent hydrogen or substituents selected from the group consisting of $C_1$-$C_8$alkyl, $C_5$-$C_6$cycloalkyl and $C_1$-$C_4$alkyl-$C_5$-$C_6$cycloalkyl with hydroxy as an optional substituent; or represent substituents selected from the group consisting of $C_2$-$C_8$alkenyl, $C_1$-$C_8$-alkoxy, $C_2$-$C_8$alkenyl, $C_1$-$C_8$alkoxy, acyl, acyloxy, $C_6$-$C_{12}$aryl and —O—$R^1$, wherein $R^1$ represents hydrogen, $C_1$-$C_4$alkyl, $C_5$-$C_6$cycloalkyl, $C_2$-$C_8$alkenyl, $C_1$-$C_4$hydroxyalkyl or $C_6$-$C_{12}$aryl.

According to another embodiment of the invention the composition comprises as Component b) at least one nitrogen compound selected from the group consisting of ammonium polyphosphate, melamine ammonium phosphate, melamine ammonium polyphosphate, melamine ammonium pyrophosphate, a condensation product of melamine with phosphoric acid and other reaction products of melamine with phosphoric acid and mixtures thereof.

The symbol X in formula VII represents, for example, an anion of phosphoric acid, polyphosphoric acid (linear or branched), pyrophosphoric acid, phosphinic acid, phosphonic acid or boric acid.

According to a preferred embodiment the composition comprises as Component b) compounds (III), (VII) and (IX), wherein $R_1$, $R_2$ or $R_3$ independently of one another represent substituents selected from the group consisting of $C_1$-$C_4$alkyl, cyclopentyl, cyclohexyl, methylcyclohexyl, $C_1$-$C_4$hydroxyalkyl, $C_2$-$C_6$alkenyl, $C_1$-$C_4$alkoxy, phenyl, phenyl, which is substituted by 1 to 3 substituents selected from the group consisting of methyl, methoxy and by halogen, —O$R^1$ and by —N($R^1$)$R^2$, wherein $R^1$ and $R^2$ independently of one another represent hydrogen, $C_1$-$C_4$alkyl, hydroxy-$C_2$-$C_4$alkyl, cycloalkyl, methylcyclohexyl, phenyl or phenyl, which is substituted by 1 to 3 substituents selected from the group consisting of methyl, methoxy and by halogen.

According to a particularly preferred embodiment the composition comprises as Component b) compounds (III), (VII) and (IX), wherein one of $R_1$, $R_2$ and $R_3$ represents hydrogen and two of $R_1$, $R_2$ and $R_3$ represent the substituents as defined above; or two of $R_1$, $R_2$ and $R_3$ represent hydrogen and one of $R_1$, $R_2$ and $R_3$ represents a substituent as defined above.

According to another preferred embodiment the composition comprises as Component b) compounds (IV), (V), (VI) and (VIII), wherein $R_1$, $R_2$, $R_3$, $R_4$ and $R_5$ independently of one another represent hydrogen or substituents selected from the group consisting of $C_1$-$C_4$alkyl, cyclopentyl, cyclohexyl, methylcyclohexyl, hydroxy-$C_2$-$C_4$alkyl, $C_2$-$C_6$alkenyl, $C_1$-$C_4$alkoxy, phenyl, phenyl, which is substituted by 1 to 3 substituents selected from the group consisting of methyl, methoxy and halogen and by —O$R^1$ wherein $R^1$ represents hydrogen, $C_1$-$C_4$alkyl, hydroxy-$C_2$-$C_4$alkyl, cycloalkyl, methylcyclohexyl, phenyl or phenyl, which is substituted by 1 to 3 substituents selected from the group consisting of methyl, methoxy and halogen.

According to a particularly preferred embodiment the composition comprises as Component b) a nitrogen compound selected from the group consisting of benzoguanamine (formula III, $R_1$=phenyl, $R_2$=$R_3$=—NH$_2$), tris(hydroxyethyl)isocyanurate (formula IV, $R_1$=$R_2$=$R_3$=—CH$_2$—CH$_2$—OH), allantoin (formula V, $R_1$=$R_2$=$R_3$=$R_4$=$R_5$=H), glycoluril (formula VI, $R_1$=$R_2$=$R_3$=$R_4$=H), melamine phosphate, dimelamine phosphate, melamine pyrophosphate, melamine polyphosphate, melamine borate (all of formula VII type), urea cyanurate (formula VIII type), melamine cyanurate (formula IX type), melam or melem phosphate, melam or melem polyphosphate, ammonium polyphosphate and melamine ammonium phosphate, pyrophosphate and polyphosphate.

The nitrogen compounds as defined and described above are known compounds or are obtainable by known methods. Some of them are commercially available.

According to a particularly preferred embodiment the composition comprises as Component b) a nitrogen compound selected from the group consisting of compounds (VII), compounds (IX), ammonium polyphosphate, melamine ammonium phosphate, melamine ammonium polyphosphate, melamine ammonium pyrophosphate, a condensation product of melamine with phosphoric acid and other reaction products of melamine with phosphoric acid and mixtures thereof.

According to a highly preferred embodiment the composition comprises as Component b) a nitrogen compound selected from the group consisting of benzoguanamine, tris(hydroxyethyl)isocyanurate, allantoin, glycoluril, melamine cyanurate, melamine phosphate, dimelamine phosphate, melamine pyrophosphate, urea cyanurate, melamine polyphosphate, melamine borate, ammonium polyphosphate, melamine ammonium polyphosphate, melamine ammonium pyrophosphate, the condensation product of melamine selected from the group consisting of melem, melam, melon and higher condensed compounds and other reaction products of melamine with phosphoric acid and mixtures thereof.

Special emphasis is given to dimelamine pyrophosphate, melamine polyphosphate, melem polyphosphate, melam polyphosphate, and/or a mixed polysalt thereof, particularly melamine polyphosphate.

According to a highly preferred embodiment the composition comprises as Component b) melamine cyanurate, such as the ones commercially available under the designation MELAPUR MC, MC 15, MC 25, MC 50.

The ratio of components a) and b) may vary within wide limits and is dependent upon the intended use. Examples of ratios a:b (ratios by weight) are from 5:95 to 95:5, e.g. from 10:90 to 90:10, preferably from 20:80 to 80:20, especially from 30:70 to 70:30 and from 40:60 to 60:40.

Component c)

The composition according to the invention comprises as Component c) a polyurethane polymer base The polymer base may be a thermoplastic polyurethane (TPU), a PU elastomer, artificial leather, PU skin, PU stray coating or reaction injection molding (RIM), a cast PU, a silylated polyurethane (SPUR), a PU hot melt adhesive or a PU hot melt adhesive.

The polyurethanes are obtainable, for example, by reacting polyethers, polyesters and polybutadienes which contain terminal hydroxyl groups, i.e. polyols, with aliphatic or aromatic polyisocyanates.

Polyethers and polyesters having terminal hydroxyl groups are known and are prepared, for example, by polymerizing epoxides such as ethylene oxide, propylene oxide, butylene oxide, tetrahydrofuran, styrene oxide or epichlorohydrin with themselves, for example in the presence of $BF_3$, or by addition reaction of these epoxides, alone or as a mixture or in succession, with starting components containing reactive hydrogen atoms, such as alcohols, ammonia or amines, for example ethylene glycol, propylene 1,3- and 1,2-glycol, trimethylolpropane, 4,4'-dihydroxydiphenylpropane, aniline, ethanolamine or ethylenediamine. Sucrose polyethers are also suitable in accordance with the invention. In many cases preference is given to those polyethers which predominantly (up to 90% by weight, based on all OH groups present in the polyether) contain primary OH groups. Furthermore, polyethers modified by vinyl polymers, as are formed, for example, by polymerizing styrene and acrylonitrile in the presence of polyethers, are suitable, as are polybutadienes containing OH groups.

These compounds generally have molecular weights of 40 and are polyhydroxy compounds, especially compounds containing from two to eight hydroxyl groups, especially those of molecular weight from 800 to 10 000, preferably from 1000 to 6000, for example polyethers containing at least 2, generally 2 to 8, but preferably 2 to 4, hydroxyl groups, as are known for the preparation of homogeneous polyurethanes and cellular polyurethanes.

It is of course possible to employ mixtures of the above compounds containing at least two isocyanate-reactive hydrogen atoms, in particular with a molecular weight of 400-10 000.

Suitable polyisocyanates are aliphatic, cycloaliphatic, araliphatic, aromatic and heterocyclic polyisocyanates, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and -1,4-diisocyanate and also any desired mixtures of these isomers, 1-isocyanato-3,3,5-trimethyl-5-isocyanatomethylcyclohexane, 2,4- and 2,6-hexahydrotolylene diisocyanate and also any desired mixtures of these isomers, hexahydro-1,3- and/or -1,4-phenylene diisocyanate, perhydro-2,4'- and/or -4,4'-diphenylmethanediisocyanate, 1,3- and 1,4-phenylene diisocyanate, 2,4- and 2,6-tolylene diisocyanate, and also any desired mixtures of these isomers, diphenylmethane 2,4'- and/or -4,4'-diisocyanate, naphthylene 1,5-diisocyanate, triphenylmethane 4,4',4"-triisocyanate, polyphenyl-polymethylene polyisocyanates as are obtained by aniline-formaldehyde condensation followed by phosgenization, m- and p-isocyanatophenylsulphonyl isocyanates, perchlorinated aryl polyisocyanates, polyisocyanates containing carbodiimide groups, polyisocyanates containing allophanate groups, polyisocyanates containing isocyanurate groups, polyisocyanates containing urethane groups, polyisocyanates containing acylated urea groups, polyisocyanates containing biuret groups, polyisocyanates containing ester groups, reaction products of the above-mentioned isocyanates with acetals, and polyisocyanates containing polymeric fatty acid radicals.

It is also possible to employ the isocyanate group-containing distillation residues as they are or dissolved in one or more of the above-mentioned polyisocyanates, which are obtained in the course of the industrial preparation of isocyanates. It is additionally possible to use any desired mixtures of the above-mentioned polyisocyanates.

Particular preference is given in general to the polyisocyanates which are readily obtainable industrially, for example aromatic isocyanates such as 2,4- and 2,6-tolylene diisocyanate and any desired mixtures of these isomers ("TDI"), polyphenyl-polymethylene-polyisocyanates as prepared by aniline-formaldehyde condensation followed by phosgenization ("crude MDI"), and polyisocyanates containing carbodiimide, urethane, allophanate, isocyanurate, urea or biuret groups ("modified polyisocyanates").

Polyurethane is preferably prepared from liquid starting components, i.e. the starting materials to be reacted with one another being mixed together in a one-shot process.

The polymer base of component c) may additionally contain in the form as admixtures or as copolymers a wide variety of other synthetic polymers including polyolefins, polystyrenes, polyesters, polyethers, polyamides, poly(meth)acrylates, thermoplastic polyurethanes, polysulphones, polyacetals and PVC, including suitable compatibilizing agents. For example, the polymer base may additionally contain thermoplastic polymers selected from the group of resins consisting of polyolefins, thermoplastic polyurethanes, styrene polymers and copolymers thereof. Specific embodiments include polypropylene (PP), polyethylene (PE), polyimide (PA), polybutylene terephthalate (PBT), polyethylene terephthalate (PET), glycol-modified polycyclohexylenemethylene terephthalate (PCTG), polysulphone (PSU), polymethylmethacrylate (PMMA), thermoplastic polyurethane (TPU), acrylonitrile-butadiene-styrene (ABS), acrylonitrile-styrene-acrylic ester (ASA), acrylonitrile-ethylene-propylene-styrene (AES), styrene-maleic anhydride (SMA) or high impact polystyrene (HIPS).

A list of suitable synthetic polymers is given below:
1. Polymers of monoolefins and diolefins, for example polypropylene, polyisobutylene, poly-but-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE). The polymers of monoolefins exemplified in the preceding paragraph, preferably polyethylene and polypropylene, can be prepared by different, and especially by the following, methods:
   a) Radical polymerisation (normally under high pressure and at elevated temperature).
   b) Catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, and amine or silyl ether groups. These catalyst systems are usually termed Phillips, Standard Oil Indiana, Ziegler-Natta), TNZ (DuPont), metallocene or single site catalysts (SSC).
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.
4. Hydrocarbon resins (for example $C_5$-$C_9$) including hydrogenated modifications thereof (e.g. tackifiers) and mixtures of polyalkylenes and starch;
    The homopolymers and copolymers mentioned above may have a stereo structure including syndiotactic, isotactic, hemi-isotactic or atactic; where atactic polymers are preferred. Stereo block polymers are also included.
5. Polystyrene, poly(p-methylstyrene), poly(α-methylstyrene).
6. Aromatic homopolymers and copolymers derived from vinyl aromatic monomers including styrene, α-methylstyrene, all isomers of vinyl toluene, especially p-vinyl toluene, all isomers of ethyl styrene, propyl styrene, vinyl biphenyl, vinyl naphthalene, and vinyl anthracene, and mixtures thereof. Homopolymers and copolymers may have a stereo structure including syndiotactic, isotactic, hemi-isotactic or atactic; where atactic polymers are preferred. Stereo block polymers are also included.
    a) Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.
    b) Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).
    c) Hydrogenated aromatic polymers derived from hydrogenation of polymers mentioned under 6a). Homopolymers and copolymers may have a stereo structure including syndiotactic, isotactic, hemi-isotactic or atactic; where atactic polymers are preferred. Stereo block polymers are also included.
7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile(or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.
8. Halogen-containing polymers such as polychloroprene, chlorinated rubbers, chlorinated and brominated copolymer of isobutylene-isoprene (halobutyl rubber), chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.
9. Polymers derived from α,β-unsaturated acids and derivatives thereof such as polyacrylates and polymethacrylates; polymethyl methacrylates, polyacrylamides and polyacrylonitriles, impact-modified with butyl acrylate.
10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1. above.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes, which contain ethylene oxide as a comonomer; polyacetals modified with thermoplastic polyurethanes, acrylates or MBS.

14. Polyphenylene oxides and sulphides, and mixtures of polyphenylene oxides with styrene polymers or polyamides.
15. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
16. Polyureas, polyimides, polyamide imides, polyether imides, polyester imides, polyhydantoins and polybenzimidazoles.
17. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
18. Polyketones.
19. Polysulphones, polyether sulphones and polyether ketones.
20. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The preparation of the compositions according to the invention may be carried out either by adding or applying the flame retardants consisting of components a) and b) according to the invention or, however, by adding or applying the individual components separately.

Preference is given to the use of components a) and b), each independently of the other, in a concentration of from 0.1 to 30.0% by weight, for example from 0.2 to 20.0% by weight, preferably from 0.2 to 15.0% by weight, based on weight of the polymer base.

The compositions according to the invention contain the flame retardant consisting of components a) and b) in an amount of, for example, from 0.1 to 50.0% by weight, preferably from 0.3 to 40.0% by weight, especially from 0.3 to 30.0% by weight or from 0.8 to 30.0% by weight, based on the composition.

The flame-resistant polymer compositions are suitable, inter alia, for the production of moulded articles, films, threads and fibres, for example by injection-moulding, extrusion or compression-moulding.

Additional Components

The instant invention further pertains to a composition, which comprises, in addition to the Components a), b) and c), as defined above, d) further additives selected from the group consisting of polymer stabilizers and additional flame-retardants selected from the group consisting of phosphorus containing flame-retardants, halogenated flame-retardants and inorganic flame-retardants.

Stabilizers are preferably halogen-free and selected from nitroxyl stabilizers, nitrone stabilizers, amine oxide stabilizers, benzofuranone stabilizers, phosphite and phosphonite stabilizers, quinone methide stabilizers and monoacrylate esters of 2,2'-alkylidenebisphenol stabilizers.

Additional flame-retardants as of present component d) are known components, items of commerce or can be obtained by known methods.

Representative phosphorus containing flame-retardants, in addition to the ones defined above with regard to component a), are for example:

Tetraphenyl resorcinol diphosphite (FYROLFLEX® RDP, Akzo Nobel), tetrakis(hydroxymethyl)phosphonium sulphide, triphenyl phosphate, diethyl-N,N-bis(2-hydroxyethyl)-aminomethyl phosphonate, hydroxyalkyl esters of phosphorus acids, resorcinol diphosphate oligomer (RDP), phosphazene flame-retardants or ethylenediamine diphosphate (EDAP).

Representative halogenated flame-retardants are, for example:

Polybrominated diphenyl oxide (DE-60F, Great Lakes Corp.), decabromodiphenyl oxide (DBDPO; SAYTEX® 102E), tris[3-bromo-2,2-bis(bromomethyl)propyl]phosphate (PB 370®, FMC Corp.), tris(2,3-dibromopropyl)phosphate, tris(2,3-dichloropropyl)phosphate, chlorendic acid, tetrachlorophthalic acid, tetrabromophthalic acid, poly-β-chloroethyl triphosphonate mixture, tetrabromobisphenol A bis(2,3-dibromopropyl ether) (PE68), brominated epoxy resin, ethylene-bis(tetrabromophthalimide) (SAYTEX® BT-93), bis(hexachlorocyclopentadieno)cyclooctane (DECLORANE PLUS®), chlorinated paraffins, octabromodiphenyl ether, hexachlorocyclopentadiene derivatives, 1,2-bis(tribromophenoxy)ethane (FF680), tetrabromobisphenol A (SAYTEX® RB100), ethylene bis-(dibromo-norbornanedicarboximide) (SAYTEX® BN-451), bis-(hexachlorocycloentadeno)cyclooctane, PTFE, tris-(2,3-dibromopropyl)-isocyanurate, and ethylene-bis-tetrabromophthalimide.

The flame-retardant mentioned above are routinely combined with an inorganic oxide synergist. Most common for this use are zinc or antimony oxides, e.g. $Sb_2O_3$ or $Sb_2O_5$. Boron compounds are suitable, too.

The above-mentioned flame-retardant classes are advantageously contained in the composition of the invention in an amount from about 0.5% to about 45.0% by weight of the organic polymer substrate; for instance about 3.0% to about 40.0%; for example about 5.0% to about 35.0% by weight of the polymer. For example, the flame-retardant of component b) is employed from about 0.5% to about 10.0% by weight, from about 1.0% to about 10.0%, from about 3.0% to about 10.0% or from about 5.0% to about 10.0% by weight, based on the weight of the polymer substrate. For example, component b) is employed from about 0.5% to about 8.0%, from about 0.5% to about 6.0%, from about 0.5% to about 5.0%, or from about 0.5% to about 3.0% by weight, based on the weight of the polymer substrate.

As mentioned above, the composition according to the invention may additionally contain one or more conventional additives, for example selected from pigments, dyes, plasticizers, antioxidants, thixotropic agents, levelling assistants, basic co-stabilizers, metal passivators, metal oxides, organophosphorus compounds, further light stabilizers and mixtures thereof, especially pigments, phenolic antioxidants, calcium stearate, zinc stearate, UV absorbers of the 2-hydroxy-benzophenone, 2-(2'-hydroxyphenyl)benzotriazole and/or 2-(2-hydroxyphenyl)-1,3,5-triazine groups. More specific examples are the following components:

1. Antioxidants 1.1 Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side-chain, e.g. 2,6-dinonyl-4-methylphenol, 2,4-dimethyl-6-(1'-methylundec-1'-yl)-phenol, 2,4-dimethyl-6-(1'-methylheptadec-1'-yl)-phenol, 2,4-dimethyl-6-(1'-methyltridec-1'-yl)-phenol and mixtures thereof.

1.2 Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecyl-thiomethyl-4-nonylphenol.

1.3 Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4 Tocopherols, for example α-tocopherol, β-tocopherol, γ-tocopherol, δ-tocopherol and mixtures thereof (Vitamin E).

1.5 Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulphide.

1.6 Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7 O-, N- and S-benzyl compounds, for example 3,5,3',5'-tetra-tert-butyl-4,4'-dihydroxydibenzyl ether, octadecyl-4-hydroxy-3,5-dimethylbenzyl mercaptoacetate, tridecyl-4-hydroxy-3,5-di-tert-butylbenzyl mercaptoacetate, tris(3,5-di-tert-butyl-4-hydroxybenzyl)amine, bis(4-tent-butyl-3-hydroxy-2,6-dimethylbenzyl)dithioterephthalate, bis(3,5-di-tert-butyl-4-hydroxybenzyl)sulphide, isooctyl-3,5-di-tert-butyl-4-hydroxybenzyl mercaptoacetate.

1.8 Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl)phenyl]2,2-bis(3,5-di-tert-butyl-4-hydroxybenzyl) malonate.

1.9 Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl benzene, 2,4 ,6-tris(3,5-d i-tert-butyl-4-hyd roxybenzyl)phenol.

1.10 Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.11 Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, calcium salt of 3,5-di-tert-butyl-4-hydroxybenzyl-phosphonic acid monoethyl ester.

1.12 Acylaminophenols, for example 4-hydroxylauric acid anilide, 4-hydroxystearic acid anilide, N-(3,5-di-tert-butyl-4-hydroxyphenyl)carbamic acid octyl ester.

1.13 Esters of β-(3,5-di-tert-butyl-4-hydroxyphenyl)propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14 Esters of β-(5-tert-butyl-4-hydroxy-3-methylphenyl) propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2] octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15 Esters of β-(3,5-dicyclohexyl-4-hydroxyphenyl)propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16 Esters of 3,5-di-tert-butyl-4-hydroxyphenylacetic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17 Amides of β-(3,5-di-tert-butyl-4-hydroxyphenyl)propionic acid, for example N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]-propionyloxy)ethyl]oxamide (Naugard® XL-1 from Uniroyal).

1.18 Ascorbic acid (Vitamin C).

1.19 Amine-type antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulphonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]ethane, 1,2-di(phenylamino)propane, (o-tolyl)-biguanide, di[4-(1,3'-dimethylbutyl)phenyl]amine, tert-octylated N-phenyl-1-naphthylamine, mixture of mono- and di-alkylated tert-butyl-/tert-octyldiphenylamines, mixture of mono- and di-alkylated nonyldiphenylamines, mixture of mono- and di-alkylated dodecyldiphenylamines, mixture of mono- and di-alkylated isopropyl-/iso-hexyl-diphenylamines, mixtures of mono- and di-alkylated tert-butyldiphenylamines, 2,3-dihydro-3,3-dimethyl-4H-1,4-benzothiazine, phenothiazine, mixture of mono- and di-alkylated tert-butyl-/tert-octyl-phenothiazines, mixture of mono- and di-alkylated tert-octylphenothiazines, N-allylphenothiazine, N,N,N',N'-tetraphenyl-1,4-diaminobut-2-ene, N,N-bis(2,2,6,6-tetramethylpiperid-4-yl)-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1 2-(2'-Hydroxyphenyl)-benzotriazoles, for example 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(α,α-dimethylbenzyl)-2'-hydroxyphenyl)-benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenylbenzotriazole, 2-(3'-dodecyl-2'-hydroxy-5'-methylphenyl)-benzotriazole, 2-(3'-tert-butyl-2'-hydroxy-5'-(2-isooctyloxycarbonylethyl)-phenylbenzotriazole, 2,2'-methylenebis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300; [R—CH$_2$CH$_2$—COO—CH$_2$CH$_2$—]$_2$ wherein R=3'-tert-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]-benzotriazole.

2.2 2-Hydroxybenzophenones, for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

2.3 Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoyl resorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

2.4 Acrylates, for example α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxycarbonyl-β-cyanovinyl)-2-methyl-indoline.

2.5 Nickel compounds, for example nickel complexes of 2,2'-thio-bis[4-(1,1,3,3-tetramethylbutyl)phenol], such as the 1:1 or 1:2 complex, optionally with additional ligands, such as n-butylamine, triethanolamine or N-cyclohexyldiethanolamine, nickel dibutyl dithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxypyrazole, optionally with additional ligands.

2.6 Sterically hindered amines, for example bis(2,2,6,6-tetramethylpiperid-4-yl)sebacate, bis(2,2,6,6-tetramethylpiperid-4-yl)succinate, bis(1,2,2,6,6-pentamethylpiperid-4-yl)sebacate, bis(1-octyloxy-2,2,6,6-tetramethylpiperid-4-yl)sebacate, n-butyl-3,5-di-tert-butyl-4-hydroxybenzylmalonic acid bis(1,2,2,6,6-pentamethylpiperidyl)ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethane-diyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensation products of N,N'-bis(2,2,6,6-tetramethyl-4-piperidyl)hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, mixture of 4-hexadecyloxy- and 4-stearyloxy-2,2,6,6-tetramethylpiperidine, condensation product of N,N'-bis(2,2,6,6-tetramethyl-4-piperidyl)hexamethylenediamine and 4-cyclohexylamino-2,6-dichloro-1,3,5-triazine, condensation product of 1,2-bis(3-aminopropylamino)ethane and 2,4,6-trichloro-1,3,5-triazine and 4-butylamino-2,2,6,6-tetramethylpiperidine (CAS Reg. No. [136504-96-6]); condensation product of 1,6-diaminohexane and 2,4,6-trichloro-1,3,5-triazine and also N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4.5]decane, reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic anhydride α-olefin copolymer and 2,2,6,6-tetramethyl-4-aminopiperidine or 1,2,2,6,6-pentamethyl-4-aminopiperidine.

2.7 Oxalic acid diamides, for example 4,4'-dioctyloxy oxanilide, 2,2'-diethoxy oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl)oxalamide, 2-ethoxy-5-tert-butyl-2'-ethyl oxanilide and a mixture thereof with 2-ethoxy-2'-ethyl-5,4'-di-tert-butyl oxanilide, mixtures of o- and p-methoxy- and also of o- and p-ethoxy-di-substituted oxanilides.

2.8 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic acid dihydrazide, oxanilide, isophthalic acid dihydrazide, sebacic acid bisphenylhydrazide, N,N'-diacetyladipic acid dihydrazide, N,N'-bis-salicyloyloxalic acid dihydrazide, N,N'-bis-salicyloylthiopropionic acid dihydrazide.

4. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

5. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrones derived from N,N-dialkylhydroxylamines prepared from hydrogenated tallow fatty amines.

6. Thiosynergistic compounds, for example thiodipropionic acid dilauryl ester or thiodipropionic acid distearyl ester.

7. Peroxide-destroying compounds, for example esters of β-thio-dipropionic acid, for example the lauryl, stearyl, myristyl or tridecyl ester, mercaptobenzimidazole, the zinc salt of 2-mercaptobenzimidazole, zinc dibutyldithiocarbamate, dioctadecyldisulphide, pentaerythritol tetrakis(β-dodecylmercapto)propionate.

8. Polyamide stabilisers, for example copper salts in combination with iodides and/or phosphorus compounds and salts of divalent manganese.

9. Basic co-stabilisers, for example melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

10. Nucleating agents, for example inorganic substances, e.g. talc, metal oxides, such as titanium dioxide or magnesium oxide, phosphates, carbonates or sulphates of preferably alkaline earth metals; organic compounds, such as mono- or poly-carboxylic acids and their salts, e.g. 4-tert-butyl-benzoic acid, adipic acid, diphenylacetic acid, sodium succinate or sodium benzoate; polymeric compounds, for example ionic copolymerisates ("ionomers"). Special preference is given to 1,3:2,4-bis(3',4'-dimethylbenzylidene)sorbitol, 1,3:2,4-di(paramethyldibenzylidene) sorbitol and 1,3:2,4-di(benzylidene)sorbitol.

11. Fillers and reinforcing agents, for example calcium carbonate, silicates, glass fibres, glass beads, talc, kaolin, mica, barium sulphate, metal oxides and hydroxides, carbon black, graphite, wood powders, and powders and fibres of other natural products, synthetic fibres.

12. Benzofuranones and indolinones, for example as described in U.S. Pat. No. 4,325,863; U.S. Pat. No. 4,338,244; U.S. Pat. No. 5,175,312, U.S. Pat. No. 5,216,052; U.S. Pat. No. 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyloxyethoxy) phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

13. Anti-gas fading agents, for example 1,1,1',1'-tetramethyl-4,4'-(methylene-di-p-phenylene)disemicarbazide; 1,6-hexamethylene bis(N,N-dimethylsemicarbazide); 11-[6-[[(2,2-dimethylhydrazino)carbonyl]amino]hexyl]-10,12-dioxo-bis(2,2-dimethylhydrazide).

14. Other additives, for example plasticisers, lubricants, emulsifiers, pigments, rheology additives, catalysts, flow improvers, optical brighteners, antistatics, blowing agents.

The further additives of Component c) are added, for example, in concentrations of 0.01 to 10.0%, relative to the total weight of the composition of this invention.

The incorporation of the additive components a) and b) and optional further components into the polymer component c) is carried out by known methods such as dry blending in the form of a powder, or wet mixing in the form of solutions, dispersions or suspensions for example in an inert solvent, water or oil. The additive components a) and b) and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc.), e.g. as a dry mixture or powder, or as a solution or dispersion or suspension or melt.

The addition of the additive components to the polymer substrate c) can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contra rotating and co-rotating twin-screw extruders, planetary-gear extruders, ring extruders or co kneaders. It is also possible to use processing machines provided with at least one gas removal compartment to which a vacuum can be applied.

Suitable extruders and kneaders are described, for example, in *Handbuch der Kunststoffextrusion, Vol.* 1 *Grundlagen,* Editors F. Hensen, W. Knappe, H. Potente, 1989, pp. 3-7, *ISBN:* 3-446-14339-4 (*Vol.* 2 *Extrusionsanlagen* 1986, *ISBN* 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The additives components a) and b) and optional further additives can also be sprayed onto the polymer substrate c). The additive mixture dilutes other additives, for example the conventional additives indicated above, or their melts so that they can be sprayed also together with these additives onto the polymer substrate. Addition by spraying during the deactivation of the polymerisation catalysts is particularly advantageous; in this case, the steam evolved may be used for deactivation of the catalyst. In the case of spherically polymerised polyolefins it may, for example, be advantageous to apply the additives of the invention, optionally together with other additives, by spraying.

The additive components a) and b) and optional further additives can also be added to the polymer in the form of a master batch ("concentrate") which contains the components in a concentration of, for example, about 1.0% to about 40.0% and preferably 2.0% to about 20.0% by weight incorporated in a polymer. The polymer is not necessarily of identical structure than the polymer where the additives are added finally. In such operations, the polymer can be used in the form of powder, granules, solutions, and suspensions or in the form of lattices.

Incorporation can take place prior to or during the shaping operation. The materials containing the additives of the invention described herein preferably are used for the production of molded articles, for example roto-molded articles, injection molded articles, profiles and the like, and especially a fiber, spun melt non-woven, film or foam.

Thus, present invention further pertains to a molded or extruded article, a fiber, spun melt non-woven or a foam comprising the composition of the invention.

A particularly preferred embodiment of the invention relates to a composition, which comprises
a) At least one ester derivative of phosphonous and phosphorous acid;
b) Melamine cyanurate; and
c) A polyurethane polymer base.

Another particularly preferred embodiment of the invention relates to a composition, which comprises
a) At least one at least one ester derivative of phosphonous and phosphorous acid selected from the group consisting of

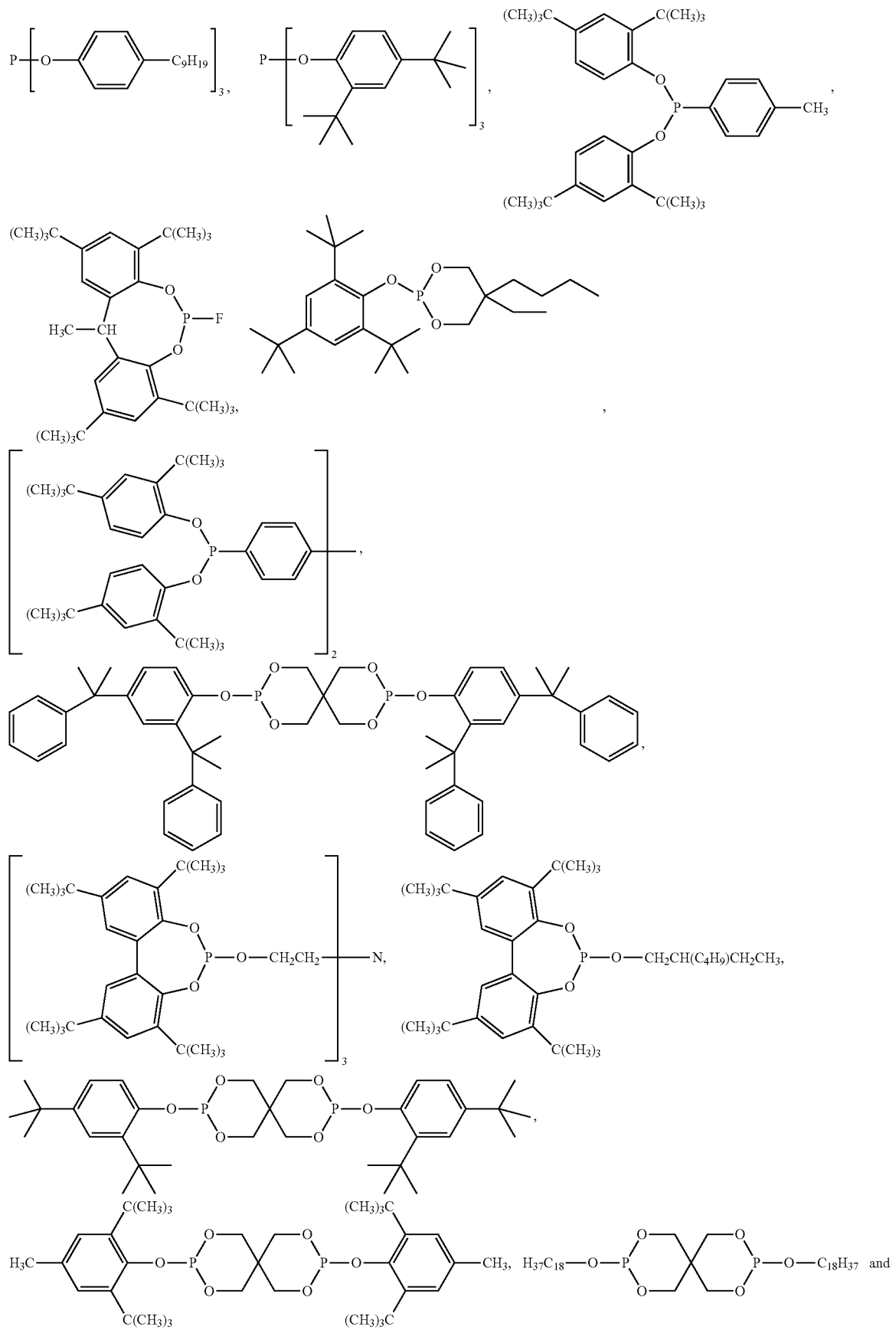

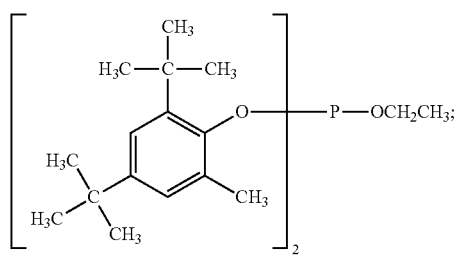

b) Melamine cyanurate; and
c) A polyurethane polymer base.

A particularly preferred embodiment of the invention relates to a composition, which comprises a) At least one ester derivative of phosphonous and phosphorous acid selected from the group consisting of

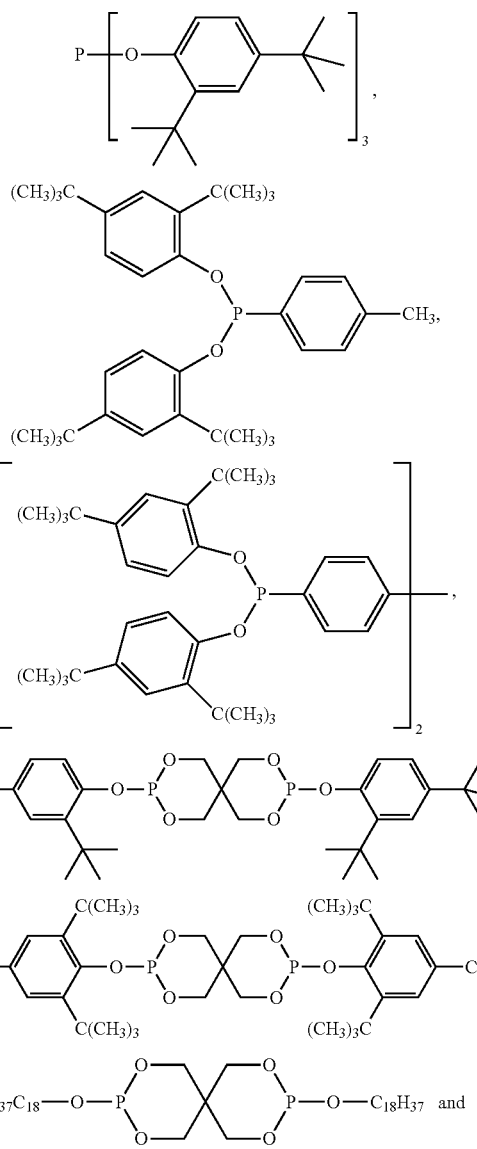

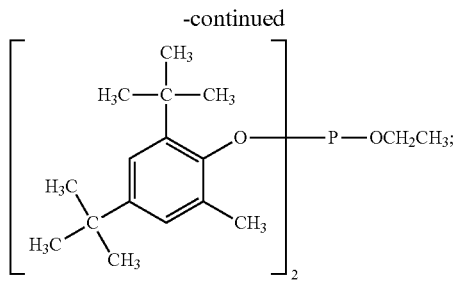

b) Melamine cyanurate; and
c) A polyurethane polymer base.

Another preferred embodiment of the invention relates to a composition, which comprises a) At least one ester derivative of phosphonous and phosphorous acid selected from the group consisting of tris nonylphenyl phosphite (TNPP), triphenyl phosphite (TPP), diphenyl phosphite (DPP), phenyl diisodecyl phosphite (PDDP), diphenyl isodecyl phosphite (DPDP), diphenylisooctyl phosphite (DPIOP), tetraphenyl dipropylene glycol diphosphite (THOP), poly (dipropylene glycol) phenyl phosphite (DHOP), dodecyl diphenyl phosphite (DDPP), triisodecylphosphite (TDP), tris tridecyl phosphite (TTDP) and trilauryl phosphite (TLP);

b) Melamine cyanurate; and
c) A polyurethane polymer base.

Another particularly preferred embodiment of the invention relates to a composition, which comprises a) At least one ester derivative of phosphonous or phosphorous acid selected from the group consisting of 9,10-dihydro-9-oxa-10-phosphorylphenanthrene-10-oxide (DOPO), bis(2,6-di-tert-butyl-4-methylphenyl)-pentaerythritol diphosphite [CAS RN 80693-00-1], [($C_6H_5$—O—)$_2$P]$_2$(—O—$C_2H_4$)$_2$ [CAS RN 57077-45-9], [($C_6H_5$—O—)$_2$P]$_2$(—O$C_2H_5$)$_{14}$($C_6H_5$—O—P)$_6$ [CAS RN 67383-54-4] and triphenyl phosphite;

b) Melamine cyanurate; and
c) A polyurethane polymer base

A further embodiment of the invention relates to a process for imparting flame retardancy to a polyurethane polymer base, which process comprises adding to said polymer base a mixture, which comprises a) At least one ester derivative of a phosphorus containing oxo acid selected from the group consisting of oxaphosphorinoxide, phosphonous acid and phosphorous acid; and b) At least one flame retardant component based on a nitrogen compound.

The following examples illustrate the invention:

EXAMPLE 1

Materials and Methods 4 kg of polyester thermoplastic polyurethane (TPU) pellets (Estane® GP 72 DB NAT 021 P (Noveon®) are mixed to homogeneity in a tumble mixer with 5-10% bis(2,4-di-tert-butylphenyl)pentaerythritol diphosphite (IRGAFOS 126), 25% melamine cyanurate (MELAPUR MC 25) and pentaerythritol tetrakis 3-(3,5-di-tert-butyl-4-hydroxyphenyl)propionate (IRGANOX 1066). This blend is compounded in twin-screw extruder (Berstorff®) at a temperature up to 220° C. The extrudate is granulated after drawing through a water bath and cooling.

125 mm×13 mm×1.6 mm test panels are moulded from the granules formed by means of an injection-moulding machine (Arburg® 320 S) at a temperature up to 220° C. (mold temperature: 50° C.).

The samples are tested for flame retardancy by the UL 94V thick section test (Underwriter's Laboratories UL94 Flammability Test: UL94 Test for Flammability of Plastic Materials for parts in Devices and Appliances, 5$^{th}$ Edition, 1996).

Results

TABLE 1

| Test No. | Amounts [%] | Components | UL94 rating*) |
| --- | --- | --- | --- |
| 1 | 25 | MELAPUR MC 25 | V-2 |
| 2 | 25 | MELAPUR MC 25 | V-0 |
|   | 5  | IRGAFOS 126   |     |
| 3 | 25 | MELAPUR MC 25 | V-0 |
|   | 10 | IRGAFOS 126   |     |

*)V-0: Very good; V-1: Good; V-2: Not sufficient

EXAMPLE 2

Materials and Methods 4 kg of polyester thermoplastic polyurethane (TPU) pellets (Estane® 58311 Natural 028 P) are mixed to homogeneity in a tumble mixer with different concentrations bis(2,4-di-tert-butylphenyl)pentaerythritol diphosphite (IRGAFOS 126), different concentrations of melamine cyanurate (MELAPUR MC 25) and 1% pentaerythritol tetrakis 3-(3,5-di-tert-butyl-4-hydroxyphenyl)propionate (IRGANOX 1066). This blend is compounded in twin-screw extruder (Berstorff®) at a temperature up to 220° C. The extrudate is granulated after drawing through a water bath and cooling.

Injection molding and testing for flame retardancy are carried out in a manner analogous to Example 1.

Results

TABLE 2

| Test No. | Amounts [%] | Components | UL94 rating*) |
| --- | --- | --- | --- |
| 1 | 30  | MELAPUR MC 25 | V-2 |
| 2 | 30  | MELAPUR MC 25 | V-0 |
|   | 7.5 | IRGAFOS 126   |     |
| 3 | 35  | MELAPUR MC 25 | V-0 |
|   | 7.5 | IRGAFOS 126   |     |
| 4 | 28  | MELAPUR MC 25 | V-0 |
|   | 7.0 | IRGAFOS 126   |     |

EXAMPLE 3

Materials and Methods 4 kg of polyester thermoplastic polyurethane (TPU) pellets (Estane® 58311 Natural 028 P) are mixed to homogeneity in a tumble mixer with different concentrations bis(2,4-di-tert-butylphenyl)pentaerythritol diphosphite (IRGAFOS 126), different concentrations of melamine cyanurate (MELAPUR MC 25) and the test compounds mentioned in Table 3 and 1% pentaerythritol tetrakis 3-(3,5-di-tert-butyl-4-hydroxyphenyl)propionate (IRGANOX 1066). This blend is compounded in twin-screw extruder (Berstorff®) at a temperature up to 220° C. The extrudate is granulated after drawing through a water bath and cooling.

Injection molding and testing for flame retardancy are carried out in a manner analogous to Example 1.

Results

TABLE 3

| Test No. | Amounts | Components | UL94 rating |
| --- | --- | --- | --- |
| 1 | 25% | MELAPUR MC 25 | V-2 |
| 2 | 30% | MELAPUR MC 25 | V-2 |
| 3 | 35% | MELAPUR MC 25 | V-2 |
| 4 | 25% | MELAPUR MC 25 | V-0 |
|   | 5%  | DOPO          |     |
| 5 | 25% | MELAPUR MC 25 | V-0 |
|   | 7.5% | DOPO         |     |
| 6 | 30% | MELAPUR MC 25 | V-0 |
|   | 5%  | DOPO          |     |
| 7 | 30% | MELAPUR MC 25 | V-0 |
|   | 7.5% | DOPO         |     |
| 8 | 30% | MELAPUR MC 25 | V-0 |
|   | 10% | DOPO          |     |
| 9 | 35% | MELAPUR MC 25 | V-0 |
|   | 5%  | DOPO          |     |
| 10 | 35% | MELAPUR MC 25 | V-0 |
|    | 10% | DOPO          |     |
| 11 | 30% | MELAPUR MC 25 | V-0 |
|    | 7.5% | ADK STAB PEP 36 |   |
| 12 | 25% | MELAPUR MC 25 | V-0 |
|    | 10% | THOP          |     |
| 13 | 30% | MELAPUR MC 25 | V-0 |
|    | 10% | THOP          |     |
| 14 | 25% | MELAPUR MC 25 | V-0 |
|    | 7.5% | DHOP         |     |
| 15 | 30% | MELAPUR MC 25 | V-0 |
|    | 10% | DHOP          |     |
| 16 | 35% | MELAPUR MC 25 | V-0 |
|    | 10% | DHOP          |     |
| 17 | 35% | MELAPUR MC 25 | V-0 |
|    | 10% | TPP           |     |

(V0 = Very Good, V1 = Good, V2 = Not Sufficient)

The invention claimed is:

1. A composition which comprises
   a) at least one ester derivative of oxaphosphorinoxide,
   b) melamine cyanurate and
   c) a polyurethane polymer base.

2. A composition according to claim 1, which comprises
   a) 9,10-dihydro-9-oxa-10-phosphorylphenanthrene-10-oxide (DOPO),
   b) melamine cyanurate and
   c) a polyurethane polymer base.

3. A process for imparting flame retardancy to a polyurethane polymer base, which process comprises adding to said polymer base a mixture which comprises
   a) at least one ester derivative of oxaphosphorinoxide and
   b) melamine cyanurate.

4. A composition comprising
a) tetraphenyl dipropylene glycol diphosphite(THOP) or poly (dipropylene glycol) phenyl phosphite (DHOP),
b) melamine cyanurate and
c) a polyurethane polymer base.

5. A process for imparting flame retardancy to a polyurethane polymer base, which process comprises adding to said polymer base a mixture which comprises
a) tetraphenyl dipropylene glycol diphosphite(THOP) or poly (dipropylene glycol) phenyl phosphite (DHOP) and
b) melamine cyanurate.

* * * * *